United States Patent
Tan et al.

(10) Patent No.: US 9,621,021 B2
(45) Date of Patent: Apr. 11, 2017

(54) AUXILIARY POWER SUPPLIES IN PARALLEL WITH A SWITCH OF A SWITCHING REGULATOR

(71) Applicant: Supertex, Inc., Sunnyvale, CA (US)

(72) Inventors: Marc Tan, Sunnyvale, CA (US); Alexander Mednik, Campbell, CA (US); Simon Krugly, San Jose, CA (US); Wilson Wai-Sum Chan, Kowloon (HK)

(73) Assignee: Microchip Technology Inc., Chandler, AZ (US)

( * ) Notice: Subject to any disclaimer, the term of this patent is extended or adjusted under 35 U.S.C. 154(b) by 524 days.

(21) Appl. No.: 13/924,302

(22) Filed: Jun. 21, 2013

(65) Prior Publication Data
US 2014/0376285 A1      Dec. 25, 2014

(51) Int. Cl.
*H02M 1/08*      (2006.01)
*H02M 3/158*     (2006.01)
*H02M 1/00*      (2006.01)
*H02M 1/36*      (2007.01)

(52) U.S. Cl.
CPC .............. *H02M 1/08* (2013.01); *H02M 3/158* (2013.01); *H02M 1/36* (2013.01); *H02M 2001/0006* (2013.01); *H02M 2001/0045* (2013.01)

(58) Field of Classification Search
CPC ....... G05F 1/468; H02M 1/08; H02M 7/5157; H02M 7/517; H02M 3/33507; H02M 3/158; H02M 2001/0045; H02M 2001/0006; H02M 1/36
See application file for complete search history.

(56) References Cited

U.S. PATENT DOCUMENTS

| | | |
|---|---|---|
| 5,119,013 A | 6/1992 | Sabroff |
| 5,400,239 A | 3/1995 | Caine |
| 5,617,015 A | 4/1997 | Goder |
| 5,751,139 A | 5/1998 | Jordan |
| 5,812,385 A * | 9/1998 | Leu .......................... H02M 1/36 363/49 |
| 6,075,295 A | 6/2000 | Li |
| 6,222,352 B1 | 4/2001 | Lenk |
| 6,504,267 B1 | 1/2003 | Giannopoulos |
| 6,549,432 B1 | 4/2003 | Giannopoulos |
| 6,636,022 B2 | 10/2003 | Sluijs |
| 6,900,620 B2 | 5/2005 | Nishimori |
| 6,946,820 B2 | 9/2005 | Ishii |

(Continued)

*Primary Examiner* — Gustavo Rosario Benitez
(74) *Attorney, Agent, or Firm* — DLA Piper LLP (US)

(57) ABSTRACT

The invention relates to the control of auxiliary power supply connected in parallel with a switch of a switching regulator. A switch and a diode are included within the connection to the auxiliary supply. The auxiliary supply switch enables a flow of current to the auxiliary supply when the auxiliary supply switch is on and the switch in parallel is off. The auxiliary diode prevents a reverse flow of current when the switch in parallel is on. The auxiliary power supply is suitable to supply of current in both stages of switching regulator operation, to configurations with a common node carrying either type of potential, steady or switching, provides supply of current at high efficiency in the switching stage of switching regulator operation, and provides high efficiency over a wide range of operating conditions of the switching regulator.

28 Claims, 3 Drawing Sheets

(56) References Cited

U.S. PATENT DOCUMENTS

| | | | |
|---|---|---|---|
| 7,132,765 B2 | 11/2006 | Premont | |
| 7,176,661 B2 | 2/2007 | Kranz | |
| 7,253,592 B2 | 8/2007 | Leyk | |
| 7,256,568 B2 | 8/2007 | Lam | |
| 7,298,116 B2 | 11/2007 | Sluijs | |
| 7,368,833 B2 | 5/2008 | Kranz | |
| 7,432,614 B2 | 10/2008 | Ma | |
| 7,466,114 B2 | 12/2008 | Derckx | |
| 7,518,263 B2 | 4/2009 | Gan | |
| 7,579,713 B2 | 8/2009 | Uguen | |
| 7,894,219 B2 | 2/2011 | Zong | |
| 8,536,808 B2 | 9/2013 | Sarig | |
| 9,315,225 B2 | 4/2016 | St-Pierre et al. | |
| 2004/0135562 A1 | 7/2004 | Oden | |
| 2006/0176719 A1* | 8/2006 | Uruno | H02M 3/158 363/89 |
| 2007/0170897 A1* | 7/2007 | Williams | H02M 3/155 323/222 |
| 2010/0097045 A1 | 4/2010 | Chen | |
| 2010/0231186 A1 | 9/2010 | Chen | |
| 2011/0019450 A1* | 1/2011 | Callanan | H03K 17/0406 363/126 |
| 2011/0228565 A1* | 9/2011 | Griffin | H02M 1/36 363/21.01 |
| 2012/0043947 A1 | 2/2012 | Wilson | |
| 2012/0256606 A1 | 10/2012 | van den Broeke | |
| 2012/0286576 A1 | 11/2012 | Jing | |
| 2013/0099846 A1* | 4/2013 | Sohma | H03K 17/04206 327/333 |
| 2013/0223120 A1* | 8/2013 | Dragojevic | H02M 7/06 363/126 |
| 2013/0265024 A1* | 10/2013 | Chen | H02M 1/08 323/282 |
| 2014/0028095 A1* | 1/2014 | Maru | H02M 3/33523 307/31 |
| 2014/0063875 A1* | 3/2014 | Al-Shyoukh | H02M 1/36 363/49 |
| 2014/0217959 A1* | 8/2014 | Chen | H02J 7/0052 320/107 |
| 2014/0300413 A1* | 10/2014 | Hoyerby | H02M 1/08 330/251 |

* cited by examiner

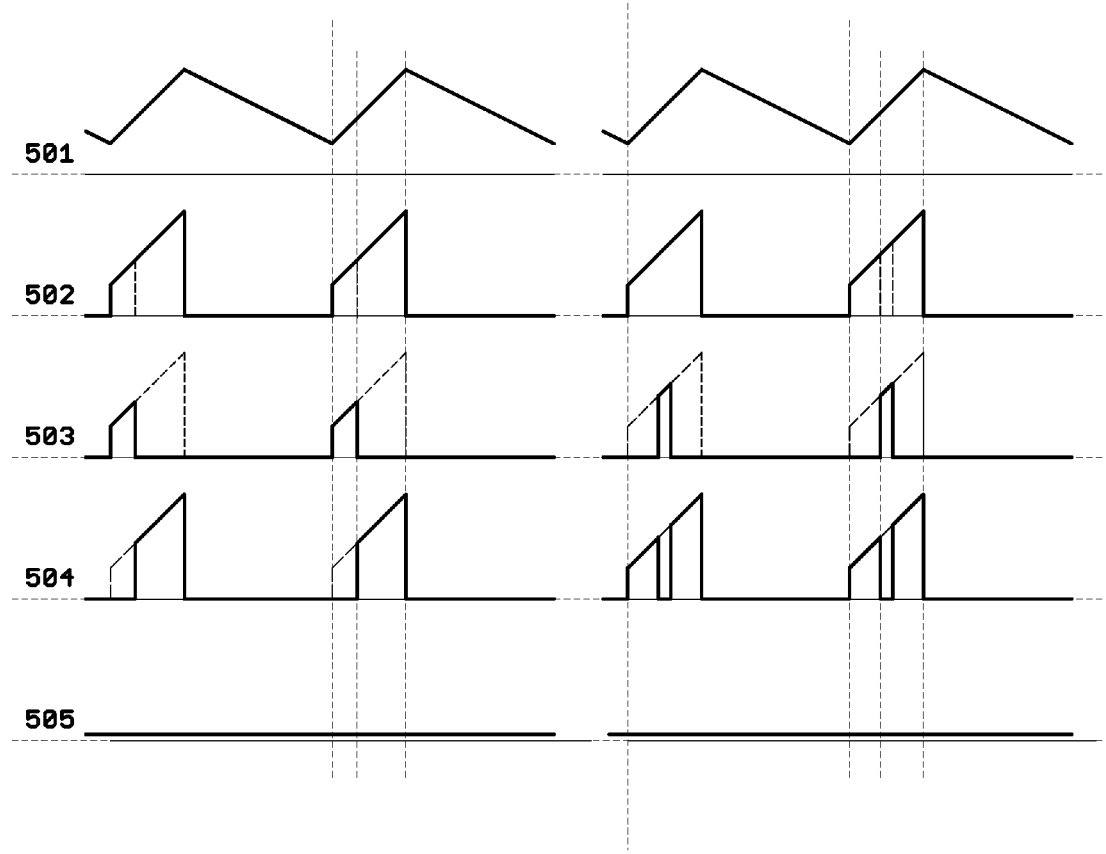

AUXILIARY POWER SUPPLIES IN PARALLEL WITH A SWITCH OF A SWITCHING REGULATOR

TECHNICAL FIELD

The invention relates to auxiliary power supplies.

BACKGROUND OF THE INVENTION

Switching regulators for the conversion of electrical power are well known. Such switching regulators generally include various control circuits. Some circuits may be quite simple, such as a gate driver, others may be quite complex, such as the main control circuit.

Invariably, a control circuit requires a supply of power of its own. A supply for control circuits commonly goes by a name such as auxiliary supply, housekeeping supply, bias supply, VDD supply or VCC supply.

An auxiliary supply by itself requires a supply of current for operation. There is a general need for circuits providing the supply of current at lowest cost, smallest circuit size and highest efficiency.

A wide variety of circuits for the supply of current exist. The suitability of some circuits depends on the operational stage of the switching regulator, the two states of main concern being the nonswitching or startup stage and the switching or running stage of switching regulator operation. The switching stage can be characterized by the stage of operation where control circuits are being prepared for switching operation of the switching regulator. The switching stage can be characterized by the stage where switching operation of the switching regulator is in place. Accordingly, some circuits are particularly suited to the nonswitching stage of switching regulator operation, whereas other circuits are particularly suited to the switching stage of switching regulator operation.

The suitability of some circuits depends on the configuration of the control circuit and its associated auxiliary supply within a switching regulator. Typically, a control circuit and its associated auxiliary supply are configured with a node in common. The potential at the common node may be broadly categorized as being one of two types, a steady voltage or a switching voltage. For instance, the main control circuit of a switching regulator and its associated auxiliary supply are typically configured with a common node carrying a steady potential. A gate driver of a floating switch within a switching regulator and its associated auxiliary supply are frequently configured with a common node carrying a switching potential. Accordingly, some circuits are particularly suited to a configuration with a common node carrying a steady potential. Other circuits are particularly suited to a configuration with a common node carrying a switching potential.

Among the more common circuits of the prior art for the supply of current is the supply by way of a resistor or a linear regulator, the supply by way of various transformer based techniques, and the supply by way of various switched capacitor techniques.

The supply of current by way of a resistor or a linear regulator is simple and low cost. This method is typically suited to the supply of current in both the nonswitching and switching stages of switching regulator operation, and is frequently suited to the supply of current for a configuration where the common node carries either a steady or a switching potential. The major drawback is the dissipation of power within the resistor or linear regulator. The dissipation becomes prohibitively large in offline switching regulators, thus requiring the use of other circuit solutions for the supply of current.

The supply of current by way of transformer techniques is more complicated but provides a supply of current with relatively high efficiency. This method typically relies on the switching operation of the switching regulator, and, therefore, is typically suited to the switching stage of switching regulator operation only. The method is generally suited to configurations where the common node carries either a steady or a switching voltage. A common drawback is a dependence of the auxiliary supply voltage on operating conditions of the switching regulator, such as loading, input voltage, or output voltage, the dependence at times requiring additional voltage regulation circuitry.

The supply of current by way of various switched capacitor techniques is generally low cost and efficient. A common configuration is the bootstrap supply. The bootstrap technique is typically suited to the switching stage of switching regulator operation only. The method is generally suited to configurations where the common node carries a switching voltage only.

What is needed is a circuit for the supply of current to an auxiliary supply that is suitable for use during the non-switching and switching stages of switching regulator operation, and that is suitable for configurations with a common node carrying either steady or switching potential, and that has minimal power dissipation.

SUMMARY OF THE INVENTION

The following discloses an invention suited to the supply of current to an auxiliary supply, where the auxiliary supply is connected in parallel with a switch of a switching regulator.

An auxiliary supply of a switching regulator frequently shares a common node with a switch of the switching regulator. Such an auxiliary supply can be connected in parallel with the switch by adding a second connection at the switch of the switching regulator.

By virtue of the connection in parallel a supply of current to the auxiliary supply is available when the switch is off. A switch and a diode are included within the connection to the auxiliary supply. The switch within the connection, hereafter the auxiliary supply switch, provides positive control over the flow of current to the auxiliary supply, that is, the auxiliary supply switch enables a flow of current to the auxiliary supply when the auxiliary supply switch is on and the switch in parallel is off. The diode within the connection, hereafter the auxiliary diode, prevents a reverse flow of current, from the auxiliary supply towards the switch, when the switch in parallel is on. The auxiliary diode is not required if the auxiliary supply switch is of a type that inherently blocks reverse current flow.

Embodiments of the circuit for the supply of current according to the present invention are characterized by low component count, are suitable to the supply of current in both stages of switching regulator operation, are suitable to configurations with a common node carrying either type of potential, steady or switching, provide the supply of current at exceptionally high efficiency in the switching stage of switching regulator operation, and provide this high efficiency over a wide range of operating conditions of the switching regulator.

The strategy for the control of the auxiliary supply switch can be manifold.

The auxiliary supply switch may be operated advantageously in both the linear region and the saturation region, or stated otherwise, may be operated advantageously as a device of significant impedance and a device of negligible impedance.

The choice of operating mode is, at least in part, determined by the operational stage of the switching regulator.

In the nonswitching stage of switching regulator operation the auxiliary supply switch may be advantageously operated as a device of significant impedance so as to power up the auxiliary supply and associated control circuits gradually, and so as to suppress the flow of large or oscillatory currents which may cause damage or create interference.

In the switching stage of switching regulator operation the auxiliary supply switch is advantageously operated as a device of negligible impedance so as to provide the desired supply of current to an auxiliary supply at highest efficiency, that is, without causing undue dissipation within the path for the supply of current.

The auxiliary supply switch is preferably closed in a part of the switching cycle which results in the lowest stress for the auxiliary supply switch and auxiliary diode.

Lowest stress for the auxiliary diode and auxiliary switch can generally be expected to occur in the parts of the switching cycle where the lowest stress for the switch of the switching regulator occurs. In general, the waveform of a switch current may be either a rising current waveform or a falling current waveform. Switches which conduct during the on time of a switching cycle generally carry a rising current, whereas switches which conduct during off time of a switching cycle generally carry a falling current. Accordingly, in a situation where the switch of the switching regulator conducts during the on time period, the auxiliary supply switch of an auxiliary supply is preferably closed towards the start of the on time period, and in a situation where the switch of the switching regulator conducts during the off time period, the auxiliary supply switch of an auxiliary supply is preferably closed towards the end of the off time period.

The connection of an auxiliary supply in parallel to a switch of the switching regulator according to the present invention is particularly advantageous where the switch of the switching regulator is implemented as a cascode switch. Here, the parallel connection of the auxiliary supply to the switch is made advantageously at the low voltage switch of the cascode switch. Such a configuration allows the voltage rating of the auxiliary supply switch to be essentially as low as the voltage rating of the low voltage switch, thereby making the auxiliary supply switch amenable to integration within power management integrated circuits (IC) built on a low voltage process.

Other aspects and advantages of the present invention will become apparent from the following detailed description, taken in combination with the accompanying drawings, illustrating by way of example the principles of the invention.

BRIEF DESCRIPTION OF THE DRAWINGS

FIG. 2 depicts current waveforms of the exemplary buck regulator.

FIG. 3 depicts current waveforms of the exemplary buck regulator.

DETAILED DESCRIPTION OF THE PREFERRED EMBODIMENTS

A first exemplary embodiment employs the principles of the invention in the setting of a buck regulator, specifically of the type where the switch, the associated gate driver circuit and associated auxiliary supply are configured with a common node carrying a switching potential.

The principles of the invention are applied to the supply of current to the auxiliary supply of the gate driver circuit. This particular embodiment exemplifies the use of the invention where the supply of current is provided in both the nonswitching and switching stages of buck regulator operation and where the common node carries a switching potential.

Figure 1:
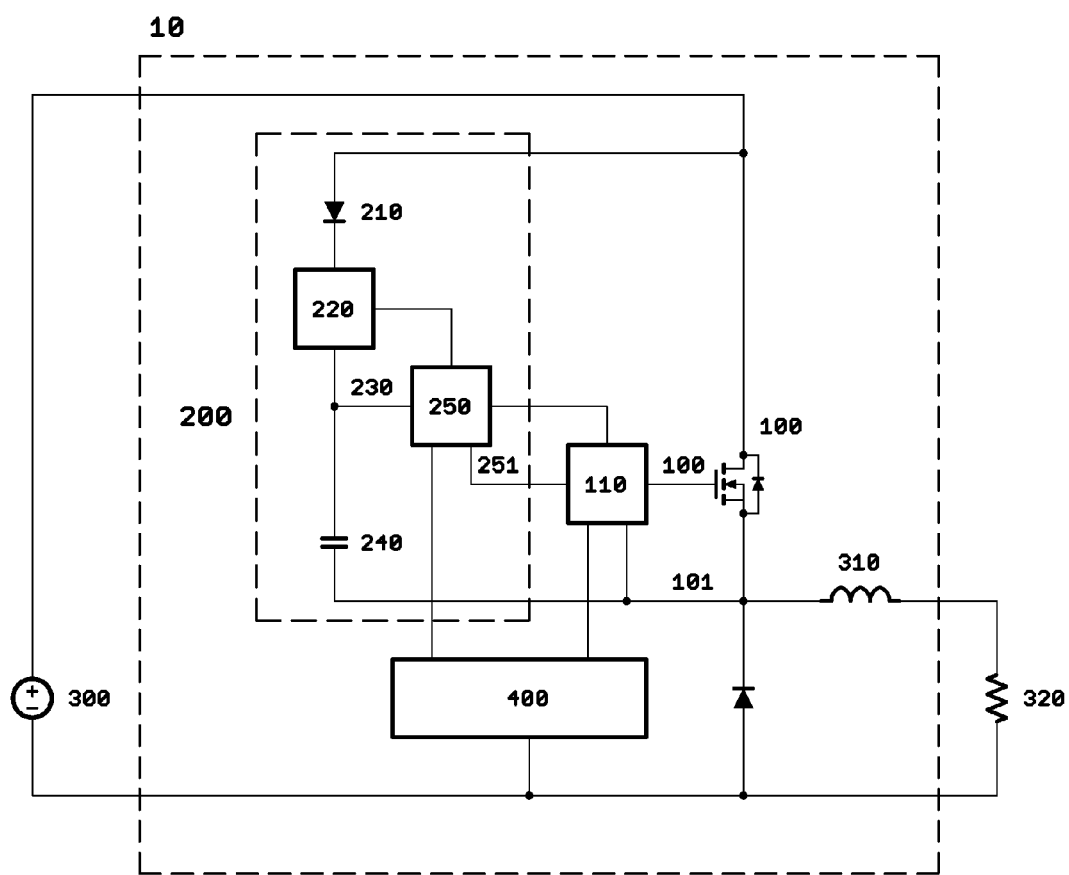
FIG. 1 depicts an exemplary embodiment of a buck regulator.

FIG. 1 depicts the exemplary buck regulator 10. Switch 100 is of the FET type. The source of the FET, is connected to node 101, commonly known as the switching node. Switch 100 is driven by gate driver circuit 110 at gate 102 of FET 100, the gate driver circuit also connected to node 101. Auxiliary supply 200 powers gate driver circuit 110, the auxiliary supply also connected to node 101.

By virtue of circuit configuration, auxiliary supply 200 and switch 100 in parallel share node 101 in common, node 101 being the switching node. The switching node carries a switching potential in the switching stage of buck regulator operation.

According to the principles of the current invention, auxiliary supply 200 is connected in parallel with switch 100 by a second connection which includes auxiliary diode 210 and auxiliary supply switch 220, the second connection providing a supply of current to input node 230 of auxiliary supply 200.

Furthermore, in FIG. 1 are shown capacitor 240, auxiliary control circuit 250 and main control circuit 400.

Capacitor 240 is connected between input node 230 and common node 101. Capacitor 240, hereafter the auxiliary capacitor, is provided to the extent that attenuation of voltage variation at input node 230 is required. An auxiliary capacitor is typically required to accommodate an intermittent delivery of current by way of the parallel connection and to accommodate an intermittent or irregular draw of current of the control circuit, here gate driver circuit 110.

Auxiliary supply control circuit 250 is connected to input node 230 in order to receive power and to sense the voltage at input node 230. Control circuit 250 controls auxiliary supply switch 220 for purpose of regulating the voltage at input node 230. Control circuit 250 may provide other control functions as well such as communication with main control circuit 400.

Main control circuit 400 provides control functions typical of a buck regulator, such as output voltage control, pulse width modulation, start up coordination, monitoring and protection. Main control circuit 400 interacts with gate driver 110.

By way of illustration, auxiliary supply switch 220 can be operated in the following manner.

In the nonswitching stage of buck regulator operation, auxiliary supply switch 220 is operated as a device of significant impedance. Auxiliary switch 220 is to be arranged as a switch of the normally on type, for example, as a depletion FET. A depletion FET is capable of conducting current when auxiliary supply 200 is in a nonenergized state. A resistor, not shown in the figure, may be included in the path of auxiliary supply switch 220 for control of current amplitude.

Upon first application of power, as provided by voltage source 300, current flows by way of (a) auxiliary diode 210, (b) auxiliary supply switch 220, (c) input node 230, (d) auxiliary capacitor 240, (e) common node 101, (f) inductor 310, and (g) load 320, here depicted as a resistor. As a consequence, the voltage on auxiliary capacitor 240 rises gradually. The impedance of auxiliary supply switch 220 can be adjusted such that the current is of relatively small amplitude for purpose of keeping the size of auxiliary diode 210 and switch 220 small and to prevent oscillation. The impedance provides damping for a circuit which generally contains many modes of oscillation as provided by the presence of inductors and capacitors attached to the path of current flow, such as auxiliary capacitor 240, inductor 310, and input and output filter components.

Auxiliary control circuit 250 regulates the voltage at input node 230 by control of auxiliary supply switch 220 in the manner of a series regulator. Many methods of control exist in the prior art for the control of a voltage by means of a series regulator.

The voltage on input node 230 and elsewhere within the auxiliary control circuit 250 ultimately rises to a level which supports regular operation of gate driver 110. Control circuit 250, or gate driver circuit 110, may then signal to main control circuit 400 that gate driver 110 is ready for switching operation. Buck regulator operation may then transition from the nonswitching stage to the switching stage depending on the readiness of other parts within buck regulator 10.

In the switching stage of buck regulator operation, auxiliary supply switch 220 is operated as a device of negligible impedance.

Many variations for implementation of the auxiliary switch exist. Auxiliary supply switch 220 may be arranged as a single device, or as two devices in parallel, a first device specifically adapted for the supply of current during the nonswitching stage of switching regulator operation, and a second device specifically adapted for the switching stage of switching regulator operation. The first device may be a normally on device or a normally off device biased for conduction when auxiliary control circuit 250 is not operational during the nonswitching stage of switching regulator operation.

Auxiliary control circuit 250 regulates the voltage at input node 230 by control of auxiliary supply switch 220 in the manner of a switching regulator. Auxiliary control circuit 250 may close auxiliary supply switch 220 during any part or for any duration of a switching cycle.

The method of control of auxiliary supply switch 220 in the switching stage of buck regulator operation can be manifold.

Auxiliary control circuit 250 adjusts the period of conduction of auxiliary supply switch 220 for purpose of controlling the voltage at input node 230. Many methods for the control of a voltage by means of pulse width modulation and feedback control are known in the art, which can be employed for this purpose.

FIGS. 2 and 3 depict exemplary current waveforms of buck regulator 10 operating in steady state mode. The Figures illustrate current waveforms corresponding with the switching stage of switching regulator operation for two modes of pulse width modulation. The following current waveforms are shown: (a) waveform 501 representing the current of inductor 310, (b) waveform 502 representing current of auxiliary supply 200 and switch 100 combined, (c) waveform 503 representing the supply of current to auxiliary supply 200, (d) waveform 504 representing the current of switch 100, and (e) waveform 505 representing the average supply of current to auxiliary supply 200. Waveform 502 equally represents the current of the source 300 and the current of inductor 310 during the on time period of the switching cycle.

Without loss of generality, buck regulator 10 is shown to operate in the continuous conduction mode. The current waveforms of FIG. 2 correspond to a control mode where auxiliary supply switch 220 closes at the start of the switching cycle, or stated alternatively, at the start of the on time period. The current waveforms of FIG. 3 correspond to a control mode where auxiliary supply switch 220 closes with a certain delay after the start of the on time period.

Both figures depict waveforms that result in a supply of current having the same average current. Whereas the average current stress for auxiliary diode and auxiliary supply switch 220 is the same for both figures, a significantly lower peak current stress is attained with the control mode of FIG. 2. Hence, the control mode of FIG. 2 is generally preferable over the control mode of FIG. 3.

It can be generally stated that a switch of a switching regulator carries a rising current if the switch closes during the on time period of a switching cycle, and that a switch of a switching regulator carries a falling current if the switch closes during the off time period of a switching cycle. Accordingly, the supply of current is preferably arranged for the start of the on time period for an auxiliary supply in parallel with a switch which closes during the on time period of a switching cycle, and the supply of current is preferably arranged for the end of the off time period for an auxiliary supply in parallel with a switch which closes during the off time period of a switching cycle.

The supply of current at the start of the on time period or at the end of the off time period is particularly advantageous for a switching regulator operating in the discontinuous mode of operation, where the switch and auxiliary supply switch currents are particularly small, that is, near zero, near the start of the on time period and near the end of the off time period.

It is shown in FIGS. 2 and 3 that the closing of auxiliary supply switch 220 is interlaced with the closing of switch 100. The supply of current by way of auxiliary supply switch 220 requires that switch 100 is open for the duration of the supply of current. Accordingly, auxiliary control circuit 250 provides inhibit signal 251 to gate driver 110 to hold off the closure of switch 100 during the supply of current to the auxiliary supply.

The control of the supply of current according to the waveforms of FIGS. 2 and 3 may be accomplished in practice in at least two manners. In a first manner, auxiliary supply switch 220 and switch 100 truly receive complementary control signals, that is to say, auxiliary supply switch 220 is commanded on when switch 100 is commanded off, and vice versa. In a second manner, auxiliary supply switch 220 is commanded on for the full duration of the on time period and switch 100 is operated for control of the supply of current, enabling flow of current to the auxiliary supply when switch 100 is commanded off and disabling the flow of current to the auxiliary supply when switch 100 is commanded on. The second manner offers an advantage in that practical complications with the implementation of true complementary switching can be avoided.

A second exemplary embodiment employs the principles of the invention in the setting of a boost regulator, specifically of the type where the switch of the switching regulator is embodied as a cascode switch, and where the common node carries a steady potential.

The use of a cascode switch as a switch of a switching regulator allows integration of the auxiliary switch and other parts of the auxiliary supply with other control circuits within an integrated circuit of low voltage rating. Furthermore, the second embodiment highlights that the common node may equally carry a steady voltage.

Figure 4:
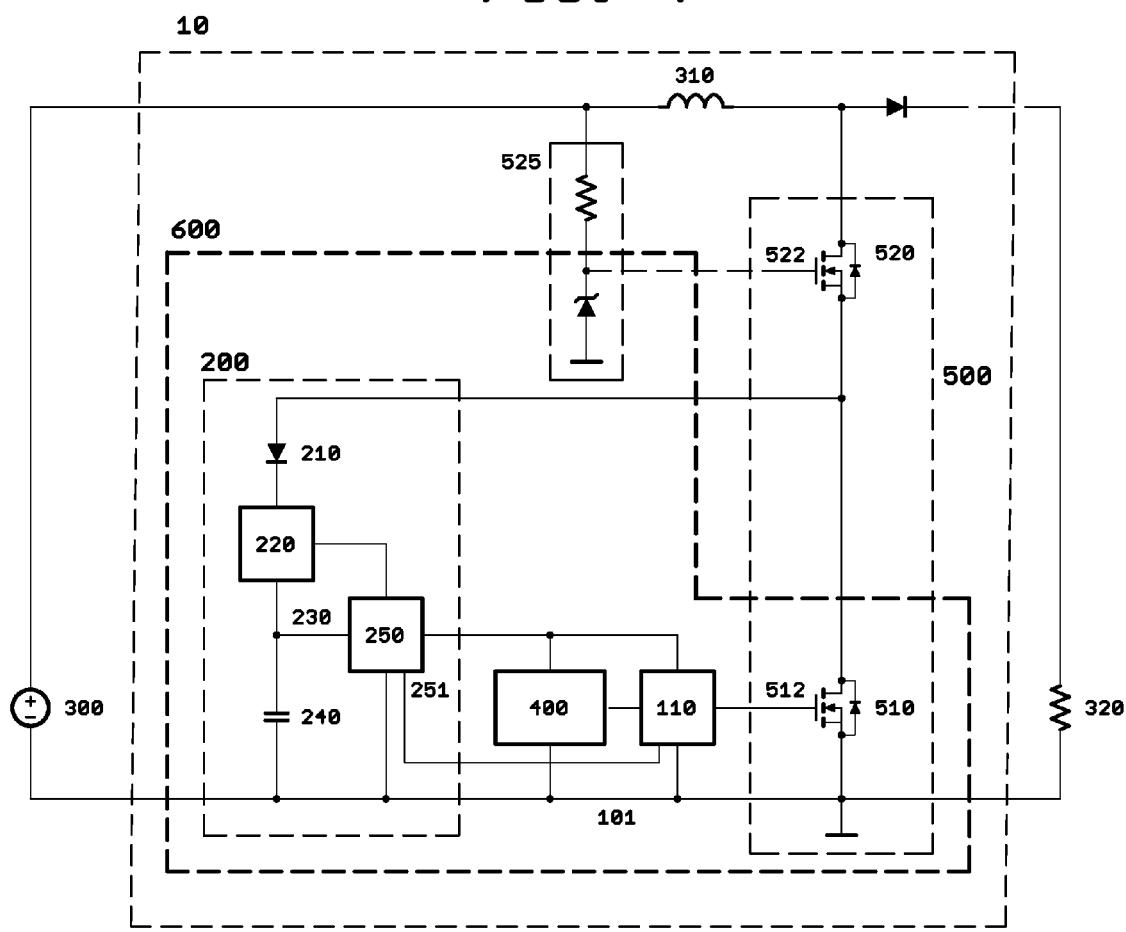
FIG. 4 depicts an exemplary embodiment of a boost regulator.

FIG. 4 depicts the exemplary boost regulator 20. Switch 500 is of the cascode type. The use of a cascode switch is well known in the art. The cascode switch offers a number of advantages, such as a lower gate drive requirement and faster, more efficient switching.

A cascode switch consists of the series connection of two devices, functionally operating as a single switch, where the source and gate terminals of the cascode switch corresponds with the like terminals of the low voltage device and the drain terminal of the cascode switch corresponds to the like terminal of the high voltage device. One of ordinary skill in the art will appreciate that the designations of low voltage and high voltage as used in low voltage device and high voltage device indicate the relative voltage ratings of the devices as frequently encountered in applications of a cascode switch, and will recognize that the principles of the invention apply regardless of the relative ratings of the two devices and that the designations are used for purpose of identification only.

Many variations exist in the art for the choice of the individual devices, the low voltage device typically being a low voltage enhancement FET, and the high voltage device typically being a high voltage enhancement FET, a high voltage depletion FET, or a high voltage BJT.

FIG. 4 shows a variation of cascode switch 500, based on a series connection of two enhancement FETs. High voltage device 520 is permanently biased for conduction at gate 522 by shunt regulator 525, whereas low voltage device 510 is controlled at gate 512 for control of the cascode switch 500.

In FIG. 4, the source of switch 500, here equivalent to the source of low voltage device 510, is connected to node 101, as is gate driver circuit 110, main control circuit 400, and auxiliary supply 200. Items labeled with the same numbers shown in FIG. 1 perform the same function described previously for FIG. 1.

By virtue of circuit configuration, auxiliary supply 200 and switch 500 in parallel share node 101 in common, node 101 being the return or ground node. This embodiment is an example of a configuration where the common node carries a steady potential.

According to the principles of the invention, auxiliary supply 200 is connected in parallel with low voltage device 510 of cascode switch 500 by a second connection which includes auxiliary diode 210 and auxiliary supply switch 220, the second connection providing a supply of current to input node 230 of auxiliary supply 200.

By way of illustration, auxiliary supply switch 220 can be operated in the following manner.

In the nonswitching stage of boost regulator operation, auxiliary supply switch 220 is operated as a device of significant impedance.

Upon first application of power, as provided by voltage source 300, current flows by way of (a) inductor 310, (b) high voltage device 520, (c) auxiliary diode 210, (d) auxiliary supply switch 220, (e) input node 230, (f) auxiliary capacitor 240, and (g) common node 101.

The supply of current causes the voltage on input node 230 to rise. Auxiliary control circuit 250 regulates the voltage at input node 230 by control of auxiliary supply switch 220 in the manner of a series regulator as before. High voltage device 520, being permanently biased for conduction is operated as part of the linear regulator.

The voltage on input node 230 and other parts ultimately rises to a level which supports switching operation of boost regulator 20. A transition from the nonswitching stage to the switching stage of boost regulator operation occurs depending on the readiness of other parts within boost regulator 20.

In the switching stage of buck regulator operation, auxiliary supply switch 220 is operated as a device of negligible impedance. All considerations provided in the description of buck regulator 10 apply equally well for the boost regulator 20 described here. This includes the operation of auxiliary supply switch 220 and switch 100, switch 100 embodied as cascode switch 500. The current waveforms of FIGS. 2 and 3 apply equally to boost regulator 20, where current waveform 504 is to be understood as the current of low voltage device 510, whereas the current of high voltage device 510 is represented by current waveform 502.

Of particular advantage is the low operating voltage of the low voltage device 510 and, by extension, the low operating voltage of auxiliary diode 210 and auxiliary supply switch 220. Most, if not all parts enclosed by boundary 600, with the possible exception of auxiliary capacitor 240, can be selected for integration into a single integrated circuit manufactured on a low voltage process.

Although the embodiments described above involved a boost regulator or buck regulator, one of ordinary skill in the art will understand that the inventions can apply to all types of regulators. For example, the inventions would apply equally to most single ended regulators, such as a buck-boost regulators, and regulators having switches referred to a floating or a switching potential such as various types of bridge regulators.

References to the present invention herein are not intended to limit the scope of any claim or claim term, but instead merely make reference to one or more features that may be covered by one or more of the claims. Materials and processes described above are exemplary only, and should not be deemed to limit the claims.

What is claimed is:

1. A device for use with a switching regulator comprising:
   an input node for receiving power; a capacitor connected between the input node and a common node being a switching node; an auxiliary supply switch and a diode connected in series, the auxiliary supply switch and the diode for connection in parallel to a switch of the switching regulator and for supplying current to an auxiliary supply of the switching regulator; and
   an auxiliary supply control circuit for regulating a voltage at the input node and for controlling the auxiliary supply switch, wherein the auxiliary supply switch is turned on at a start of an on time period for a switching cycle or an end of an off time period for the switching cycle, and wherein the switch is turned off during any part where the auxiliary supply switch is turned on during the on time period or the off time period of the switching cycle.

2. The device of claim 1, wherein the switch of the device operates in linear mode during a nonswitching stage of switching regulator operation and operates in saturated mode during a switching stage of switching regulator operation.

3. The device of claim 1, wherein the switch of the device is a field effect transistor.

4. The device of claim 1, wherein the switch and the diode are connected in series with the capacitor.

5. The device of claim 1, wherein the switch of the switching regulator is a cascode switch.

6. The device of claim 5, wherein the cascode switch comprises a first enhancement field effect transistor connected in series with a second enhancement field effect transistor.

7. The device of claim 1, wherein the switching regulator is a boost regulator.

8. The device of claim 1, wherein the switching regulator is a buck regulator.

9. The device of claim 1, wherein the switching regulator is a buck-boost regulator.

10. A switching regulator, comprising:
a first switch controlled by a control circuit;
an auxiliary supply comprising an input node and an auxiliary supply control circuit for providing current to the control circuit, wherein the auxiliary supply is connected in parallel with the first switch, wherein the auxiliary supply control circuit is connected to the input node for regulating a voltage at the input node;
a device for providing current to the auxiliary supply comprising a second switch and a diode connected in series, within the connection in parallel, which connects the auxiliary supply in parallel with the first switch; and
a gate driver circuit for driving the second switch, wherein the gate driver circuit is configured with a common node for carrying a switching potential, and is operative to receive an inhibit signal from the auxiliary supply control circuit to hold off a closure of the first switch during the supply of current to the auxiliary supply, wherein the second switch is turned on at a start of an on time period for a switching cycle or an end of an off time period for the switching cycle, and wherein the first switch is turned off during any part where the second switch is turned on during the on time period or the off time period of the switching cycle.

11. The switching regulator of claim 10, wherein the first switch comprises a first terminal and a second terminal and the diode is connected to the first terminal.

12. The switching regulator of claim 11, wherein the second terminal is connected to an inductor and the inductor is coupled to a load of the switching regulator.

13. The switching regulator of claim 11, further comprising a voltage source coupled to the first terminal.

14. The device of claim 10, wherein the second switch operates in a linear mode during a nonswitching stage of operation of the switching regulator and in a switching mode during a switching stage of operation of the switching regulator.

15. The device of claim 10, wherein the first switch is a cascode switch, and wherein the connection in parallel is made at a junction of a low voltage and high voltage device of the cascade switch.

16. The device of claim 15, wherein the cascode switch comprises a first enhancement field effect transistor connected in series to a second enhancement field effect transistor.

17. The device of claim 15, wherein the cascode switch comprises a depletion mode junction gate field effect transistor (JFET).

18. The device of claim 15, wherein the switching regulator is a boost regulator.

19. The device of claim 15, wherein the switching regulator is a buck regulator.

20. The device of claim 15, wherein the switching regulator is a buck-boost regulator.

21. A method for supplying current to an auxiliary supply of a switching regulator during a switching stage of a switching regulator operation, wherein the auxiliary supply is connected in parallel to a first switch of the switching regulator and wherein the parallel connection of the auxiliary supply comprises a diode and a second switch connected in series, the method comprising:
closing the second switch in saturated mode at a start of an on time period for a switching cycle or an end of an off time period for the switching cycle, and opening the first switch during any part where the second switch is closed during the on time period or the off time period of the switching cycle; and receiving an inhibit signal from an auxiliary supply control circuit to hold off a closure of the first switch during the supply of current to the auxiliary supply.

22. The method of claim 21, wherein the first switch is a field effect transistor.

23. The method of claim 22, wherein the second switch is a field effect transistor.

24. The method of claim 21, further comprising:
the second switch operating in linear mode during a nonswitching stage of switching regulator operation.

25. A method for supplying current to an auxiliary supply of a switching regulator during a switching stage of a switching regulator operation, wherein the auxiliary supply is connected in parallel to a first switch of the switching regulator and wherein the parallel connection of the auxiliary supply comprises a diode and a second switch connected in series, the method comprising:
closing the second switch in saturated mode at a start of an on time period for a switching cycle or an end of an off time period for the switching cycle, and opening the first switch during any part where the second switch is closed during the on time period or the off time period of the switching cycle; and receiving an inhibit signal from an auxiliary supply control circuit to hold off a closure of the first switch during the supply of current to the auxiliary supply.

26. The method of claim 25, wherein the first switch is a field effect transistor.

27. The method of claim 26, wherein the second switch is a field effect transistor.

28. The method of claim 25, further comprising:
the second switch operating in linear mode during a nonswitching stage of switching regulator operation.

* * * * *